March 11, 1952

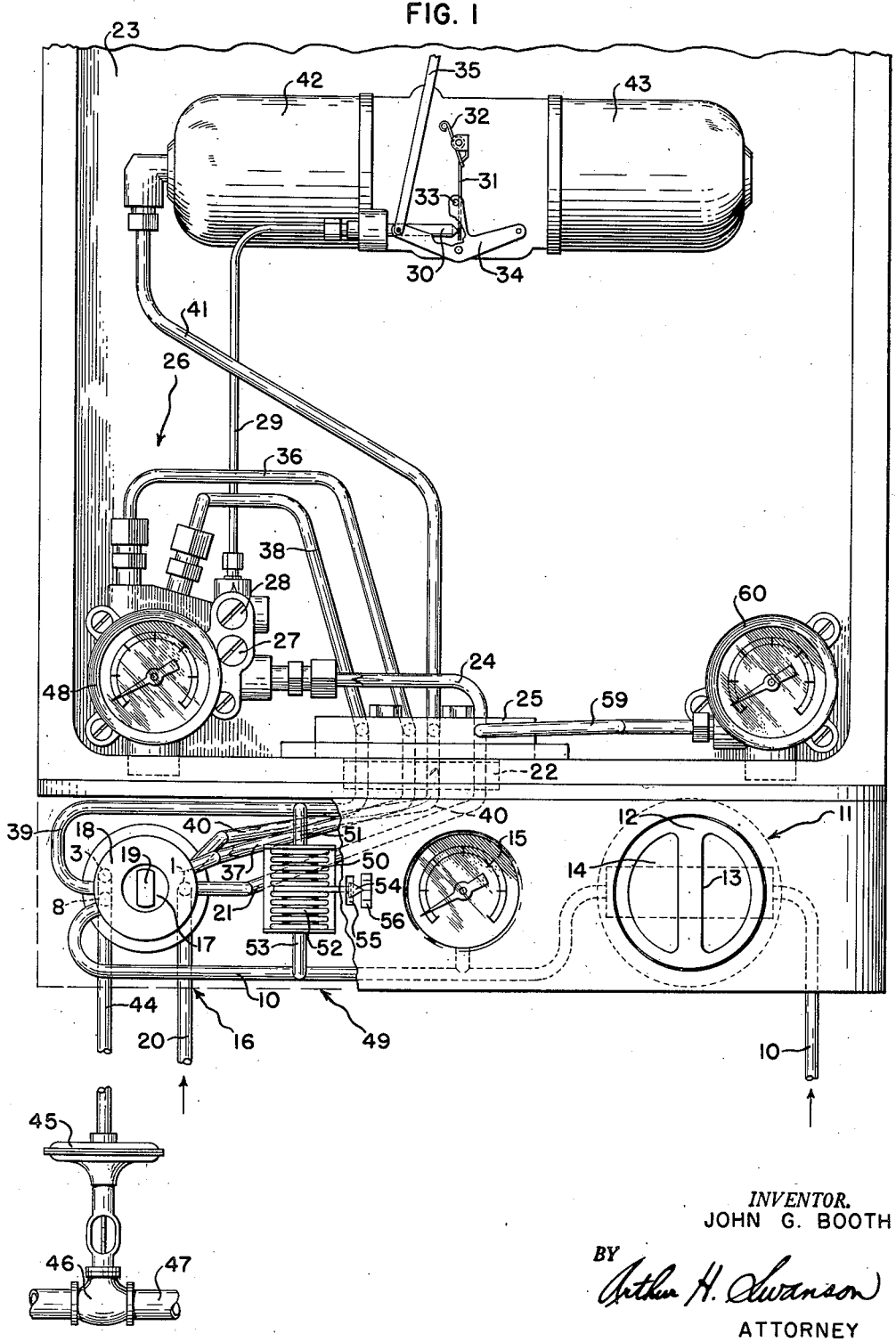

J. G. BOOTH 2,588,799

MANUAL TRANSFER BETWEEN AUTOMATIC AND MANUAL REGULATING CONTROLLERS

Filed Oct. 14, 1947

INVENTOR.
JOHN G. BOOTH
BY
Arthur H. Swanson
ATTORNEY

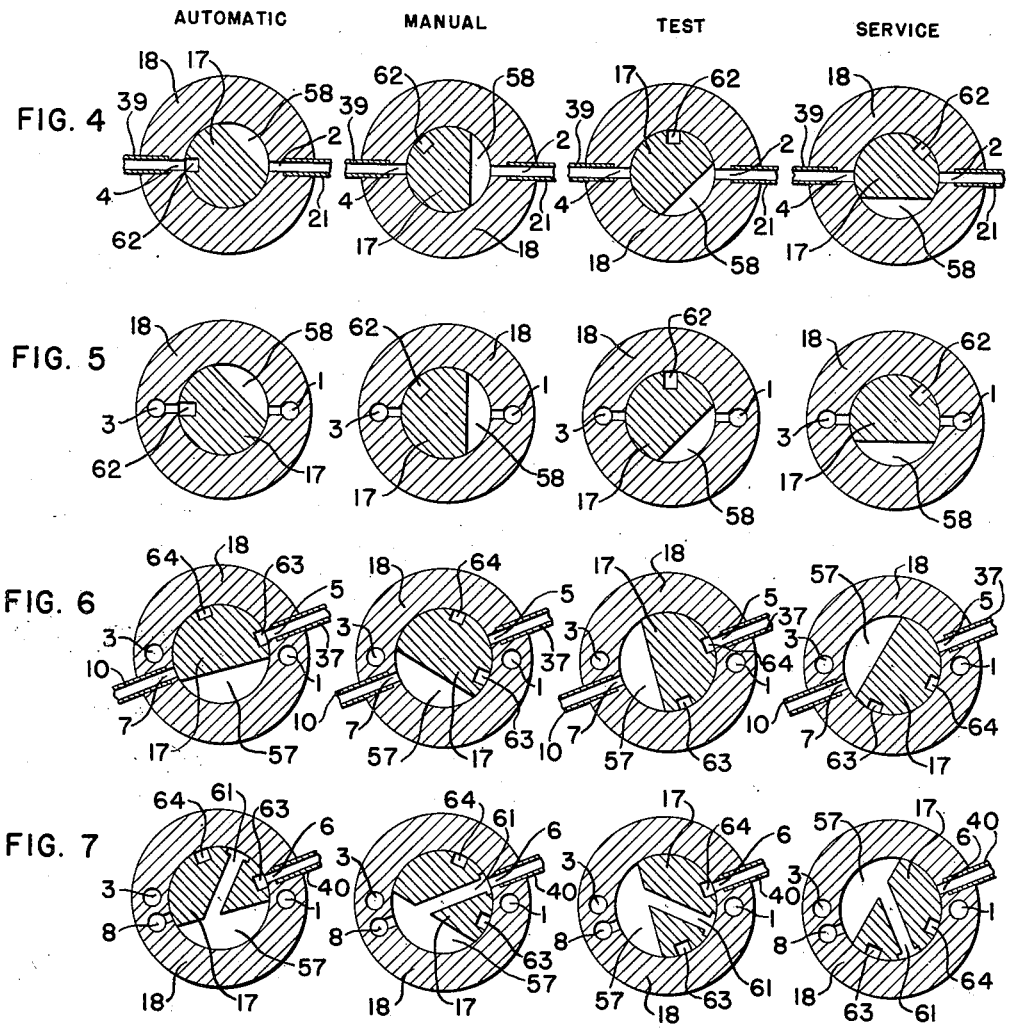

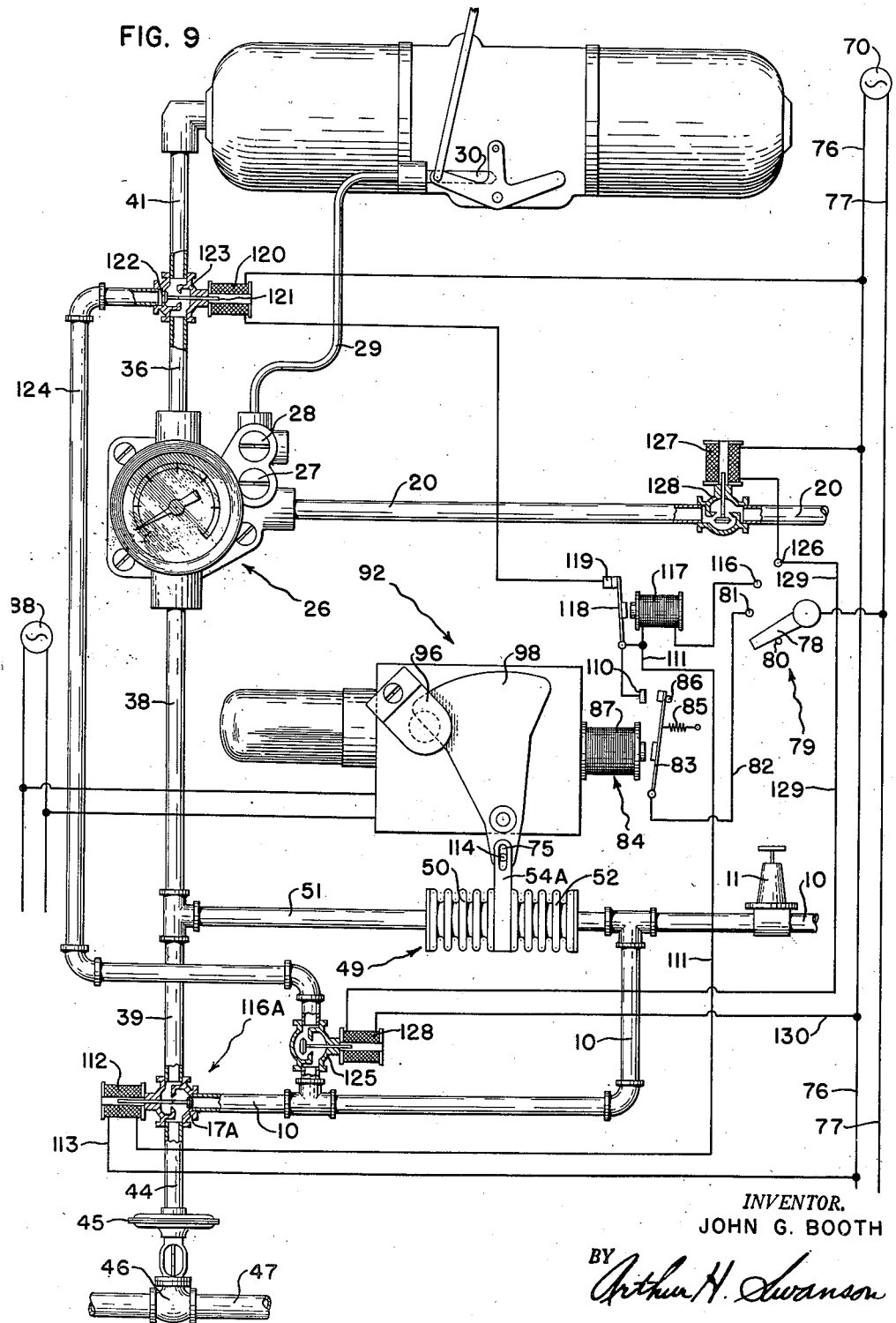

INVENTOR.
JOHN G. BOOTH
BY
ATTORNEY.

March 11, 1952

J. G. BOOTH 2,588,799

MANUAL TRANSFER BETWEEN AUTOMATIC AND
MANUAL REGULATING CONTROLLERS

Filed Oct. 14, 1947

*INVENTOR.*
JOHN G. BOOTH

BY Arthur H. Swanson

ATTORNEY

Patented Mar. 11, 1952

2,588,799

UNITED STATES PATENT OFFICE 2,588,799

MANUAL TRANSFER BETWEEN AUTOMATIC AND MANUAL REGULATING CONTROLLERS

John G. Booth, Philadelphia, Pa., assignor, by mesne assignments, to Minneapolis-Honeywell Regulator Company, Minneapolis, Minn., a corporation of Delaware Application October 14, 1947, Serial No. 779,712

4 Claims. (Cl. 137—153)

This invention relates to control devices adapted to be actuated in response to a manually variable fluid pressure or to an automatically variable fluid pressure. The fluid employed is usually air although any other suitable gas or liquid may be utilized.

The control devices which are the subject of this invention are customarily employed for controlling industrial processes. In order to start such a process or in case of disturbance to or interruption of the process, it is desirable to provide means for manually controlling the process by the use of a portion of the automatic control means which govern the process when the operations are proceeding normally in the desired manner. It is desirable that the shift over or transfer of control of the process from manual to automatic control or vice versa take place without varying the conditions under which the process is operating at the time the shift is made. In the case in which the valve or other final process-controlling element is operated by a fluid-pressure-operated motor, this requires that the fluid pressure applied to the motor and the fluid pressure about to be applied to the motor be equal or at some other desired ratio. If these pressures are equal or at some other desired relation there will be no movement of the final process-controlling element and, consequently, no disturbance to the controlled process when the shift or transfer is made.

It is an object of this invention to provide means for shifting the control of the device from the automatically variable fluid pressure to the manually variable fluid pressure or vice versa when the two pressures are equal or at some preselected ratio to each other.

It is a further object of this invention to provide means for automatically transferring or shifting control of the device from the manually variable fluid pressure to the automatically variable fluid pressure or vice versa. This automatic transfer or shift is effected by a differential-fluid-pressure-operated motor whose output movement is responsive to the opposing force of the manual and of the automatic fluid pressure. When these pressures are equal or at some other preselected ratio to each other, the differential-fluid-pressure-operated motor closes a switch or valve which connects another motor (which operates the transfer valve) to its source of operating power. When so connected, this other motor is energized and moves the transfer valve to connect yet another motor (which operates the final control valve or other process-controlling element) either to the manually controlled fluid pressure or to the automatically controlled fluid pressure so that the last named motor and consequently, the process-controlling device to which it is connected, is under either manual or automatic control.

Another object of this invention is to effect the shift or transfer of control over the final control element by means of a relay valve or switch between the motor, which actuates the transfer valve, and the source of power for this motor. This relay valve is actuated by a power-circuit in response to the balance or equalization of the manually and of the automatically variable fluid pressures. This power circuit opens or closes the relay with a snap or instantaneous action and can be regulated to take place by a very short movement within narrowly defined limits. The power for the relay-actuating-circuit may be a fluid, such as air, or electricity.

The various features of novelty which characterize this invention are pointed out with particularity in the claims. annexed to and forming a part of this specification. For a better understanding of the invention, however, its advantages and specific objects obtained with its use, reference should be had to the accompanying drawings and description matter in which is illustrated and described a preferred embodiment of the invention.

Of the drawings:

Fig. 1 is a front elevation of a preferred embodiment of the invention with parts broken away to disclose a part of the interior;

Fig. 4 is four vertical transverse cross sections on line 4—4 of Fig. 3 viewed in the direction of the arrows on line 4—4 showing the valve in each of its different operative positions;

Fig. 5 is four vertical transverse cross sections on line 5—5 of Fig. 3 viewed in the directions of of the arrows on line 5—5 showing the valve in each of its different operative positions;

Fig. 6 is four vertical transverse cross sections on line 6—6 of Fig. 3 viewed in the direction of the arrows on line 6—6 showing the valve in each of its different operative positions;

Fig. 7 is four vertical transverse cross sections on line 7—7 of Fig. 3 viewed in the direction of the arrows on line 7—7 of Fig. 3 showing the valve in each of its different operative positions;

Fig. 9 is a diagrammatic or schematic view with parts shown in front elevation and in cross section of a modification of Fig. 8;

Manual transfer of control

Figure 2:
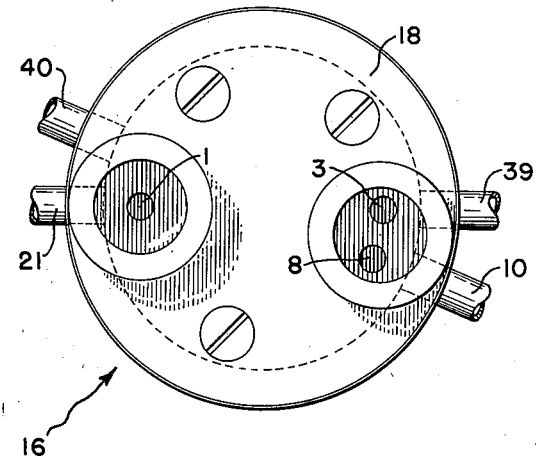
Fig. 2 is a rear elevation of the transfer valve.

Figs. 1 to 7 show a control device adapted to be powered by a manually variable fluid pressure or by an automatically variable fluid pressure in which the switch over or transfer of control from manual to automatic is effected by a manually operated transfer valve. The fluid employed is usually air although any other convenient gas or liquid may be employed. Fluid such as air, from a source of filtered air at a proper pressure, such as 17 pounds per square inch, enters the device through an inlet conduit 10 in which is connected a manually operated pressure regulator, generally indicated at 11. An operating handle 12 is generally in the shape of a disc having a bar or block-shaped finger piece 13 separating two semi-spherical cavities or depressions 14 for receiving the fingers of the operator. Inlet conduit 10 continues, having connected to it an inlet pressure gauge 15, and terminates in inlet port 7 of the manually operated transfer valve, generally indicated at 16. Transfer valve 16 has a movable valve body or plug 17 rotatably mounted in a body or case 18. Plug 17 has at its front a flat-sided projection 19 adapted for insertion into a mating cavity in the rear of a handle similar to handle 12 of the inlet pressure regulator 11.

Air from the source also enters the device through an inlet conduit 20 which communicates with the transfer valve 16 by means of a port 1 in the rear. An air inlet pipe 21 communicates with the transfer valve 16 by means of a port 2 and communicates at its opposite end with a by-pass manifold 22 adapted for connection to the bottom of the instrument casing 23. A second inlet conduit 24 communicates at one end with a casing manifold 25 and at its opposite end with the inlet to a relay or pilot valve, generally indicated at 26. Pipe 59 communicates with inlet conduit 24 at the casing manifold 25 and, at its opposite end, with a pressure gauge 60. Gauge 60 indicates the instantaneous value of the inlet air applied to relay valve 26. Relay valve 26 has an air filter 27 and a restrictive orifice 28 with which communicates one end of a control pipe 29 which terminates in a nozzle 30. The escape of air through the nozzle 30 is controlled by a flapper valve 31 biased in one direction by a spring 32 and in the opposite direction by a pin 33 mounted on a pivotally supported lever 34 which is rocked about its pivot by a rod 35 actuated by the condition or action in response to which the automatic control of the device is exerted.

Relay valve 26 has connected to it an outlet conduit 36 which leads through the casing manifold 25 and the by-pass manifold 22 to the outlet conduit 37 which communicates with the inlet port 5 of the transfer valve 16. Relay valve 26 has a second outlet conduit 38 communicating through casing manifold 25 and by-pass manifold 22 with an outlet pipe 39, communicating at its opposite end with the inlet port 4 of the transfer valve 16. From port 6 of the transfer valve 16 leads an outlet conduit 40 communicating through by-pass manifold 22 and casing manifold 25 with a conduit 41 connected to a follow up device 42 which yet has connections with a reset device 43. Transfer valve 16 has in its rear a pair of outlet ports 3 and 8 which communicate with an outlet conduit 44 terminating at a fluid-pressure-operated motor 45. Motor 45 operates a valve 46 which controls the flow of fluid, such as fuel, or other process-controlling operation of the pipe 47. Relay valve 26 has on its face a gauge 48 which is connected to the outlet cavity of the relay valve 26 so that gauge 48 shows the instantaneous value of the automatically regulated fluid pressure.

As an alternative to the use of the fluid pressure gauge 15, which indicates the pressure of the manually regulated fluid, and to the use of the pressure gauge 48, which indicates the automatically regulated fluid pressure, there is shown a differential fluid pressure actuated gauge, generally indicated at 49. Differential gauge 49 has a bellows 50 whose interior is connected to the automatically regulated fluid pressure by means of pipe 51 communicating with conduit 39. Differential gauge 49 also has a bellows 52 whose interior communicates with the manually regulated fluid pressure by means of a pipe 53 connected at its opposite end to inlet conduit 10. Mounted on bellows 50 and 52 as to be movable in response to any difference between the manually and the automatically regulated fluid pressures is an indicator 54 whose end passes through a hole 55 in the by-pass panel and is movable passed a scale 56 having indicating marks on it.

Operation of manual transfer

Figure 3:
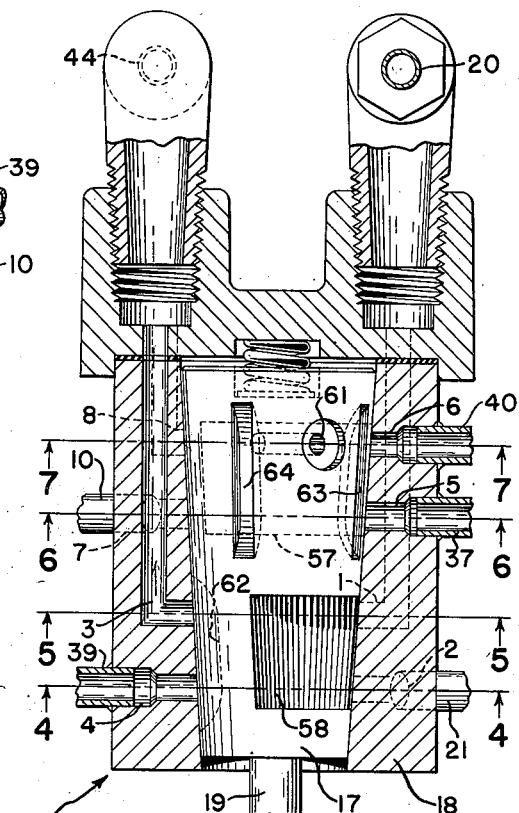
Fig. 3 is a longitudinal cross section on line 3—3 of Fig. 1A viewed in the direction of the arrows.

In order to start the process controlled by the valve 46 in the pipe 47, air is supplied through the inlet conduit 10 and manually regulated by suitable adjustment of the handle 12 of the pressure regulator 11. This air passes from conduit 10 through inlet port 7 (Fig. 3) of the transfer valve 16, the valve plug 17 being in the position marked "Manual" in Figs. 4 to 7. Fig. 6, under the heading "Manual," shows that the air entering inlet port 7 passes through the valve case 18 into a large notch-shaped cavity 57. Fig. 7, under the heading "Manual," shows that cavity 57 communicates with the outlet port 8 in the valve case 18. Fig. 3 shows that outlet port 8 leads to the rear of the case 18 where it communicates with the pipe 44 leading to the fluid pressure operated motor 45. Thus motor 45 is under the direct control of the manually operated pressure regulator 11. Figs. 4 and 5, under the heading "Manual," show that the inlet port 4 and the outlet port 3 in the valve case 18 are closed by the valve plug 17. However, the inlet port 1 which enters the valve case 18 through the rear (Fig. 3) and the outlet port 2 are both in communication with the large notch-shaped cavity 58 in the valve plug 17. Consequently, air from the inlet conduit 20 (Fig. 1) passes through inlet port 1, notch 58 (Fig. 5) in the valve plug 17, outlet port 2, outlet conduit 21 (Fig. 1), by-pass manifold 22, casing manifold 25, and inlet conduit 24, to the inlet of relay valve 26. This inlet air passes through filter 27, restrictive orifice 28, and pipe 29 to nozzle 30. The escape of air from nozzle 30 is controlled by the flapper 31 automatically in response to the action or condition governing the process.

Fig. 6, under the heading "Manual," also shows that the manually regulated fluid pressure from the inlet conduit 10 passes through port 7, cavity 57 in valve plug 17, by-pass port 61 (Fig. 7), outlet port 6 (Fig. 7), outlet conduit 40 (Fig. 1), by-pass manifold 22, casing manifold 25, conduit 41 to follow up mechanism 42. Thus the follow up mechanism 42 is exposed to the same pressure as is the motor 45 controlling the valve 46. When the process has continued for sufficient time for it to operate smoothly and normally, a transfer can be made manually from the manually regulated fluid pressure to the automatically regulated fluid pressure. This switch over or transfer of control of the process is done by turning the valve plug 17 counter-clockwise, as seen in Figs. 1 and 4 to 7, from the position in which the plug 17 is shown in Figs. 4 to 7 "Manual" to the position in which the plug 17 is shown in Figs. 4 to 7 "Automatic." The valve plug 17, or the operating handle for it, is supplied with a suitable click or detent (not shown) which holds the valve plug in either position of operation.

Assuming the valve plug 17 to have been turned manually counter-clockwise, as seen in Figs. 1 and 4 to 7, into the position labeled "Automatic," the flow of air is as follows. Fig. 6 shows that the inlet port 7 is closed by valve plug 17. Consequently no air from the manually operated pressure regulator 11 passes beyond the transfer valve 16. Air from inlet conduit 20 (Fig. 1) flows through inlet port 1 in the rear of the transfer valve 16, cavity 58 in valve plug 17, (Fig. 5), outlet port 2, inlet conduit 21 (Fig. 1), by-pass manifold 22, casing manifold 25, and inlet conduit 24, to the relay valve 26. Outlet air flows from the pilot valve 26 through the outlet pipe 38, the manifolds 25 and 22, conduit 39, inlet orifice 4 (Fig. 4), a narrow port 62 in valve plug 17, outlet port 3 (Fig. 3), pipe 44 (Fig. 1) to motor 45. Motor 45 is therefore under the automatic control of the condition governing the process by means of the flapper 31 which, in turn, control the flow of air through the relay valve 26. At the same time, the outlet pressure of the air from relay 26 passes through conduit 36 (Fig. 1), manifolds 25 and 22, conduit 37, inlet port 5 (Fig. 6), cavity 63 in valve plug 17, outlet port 6 (Fig. 7), conduit 40 (Fig. 1), manifolds 22 and 25, and pipe 41 to follow up mechanism 42. Follow up mechanism 42 is therefore exposed to the outlet pressure of the automatically regulated air which controls valve 46 and operates motor 45.

Figs. 4 to 7 also show that transfer valve 16 is provided with two additional positions or stations "Test" and "Service." In the "Test" position, the motor 45 (Fig. 1), which operates the final control element 46, is under the control of the manually operated pressure regulator 11. At the same time, the follow up device 42 and the reset device 43 are connected to manually operated pressure regulator 11 and are therefore adjusted to a position determined by the pressure set by this regulator. In the "Service" position, the pilot or relay valve 26, the follow up device 42 and the reset device 43 are all disconnected from any source of air or fluid pressure by means of the valve 16 without the use of any additional valves. The motor 45 is connected to the manually operated pressure regulator 11 so that the valve 46 and the process controlled thereby can proceed under manual regulation. The relay valve 26, the follow up 42 and the reset 43 can be removed to any convenient place for adjustment or repair.

With the valve plug 17 in the "Test" position the connections are as follows:

Ports 1 and 2 are in communication through cavity 58 so that air is applied from inlet conduit 20 (Fig. 1) to the relay valve 26, the automatic controlling nozzle 30, and the follow up mechanism 42 through the connections already described. Figs. 6 and 7 shows that cavity 64 in valve plug 17 connects inlet port 5 with outlet port 6 to establish communication for the air between relay valve 26 and follow up mechanism 42 through the conduits connected to inlet port 5 and outlet port 6.

When the valve plug 17 is in the position shown under the heading "Service" in Figs. 4 to 7, manually regulated fluid pressure from conduit 10 passes through inlet port 7 (Fig. 6), cavity 57 in plug 17, through outlet port 8 (Figs. 7 and 3) and pipe 44 to motor 45. Motor 45 is therefore under the control or regulation of manually operable pressure regulator 11. Inlet port 1 is closed by a valve plug 17 (Fig. 5). Inlet port 4 is closed by a valve plug 17 (Fig. 4). Therefore the air is shut off from the relay valve 26. Ports 5 and 6 may be either opened or closed since no air reaches inlet port 5. When transfer valve 16 is in the "Service" position manifold 22 can be detached from the instrument case 23 so that the instrument case 23 with the relay valve 26 and the rest of the mechanism therein can be removed leaving the motor 45 under manual control.

*Automatic transfer of control*

In many cases it is desirable automatically to perform the transfer or shift of the control of the process from manual control to automatic control or vice versa in response to the balance of the manually and of the automatically controlled fluid pressures. This balance may exist when these pressures are equal or when they are at some other desired ratio.

Figure 8:
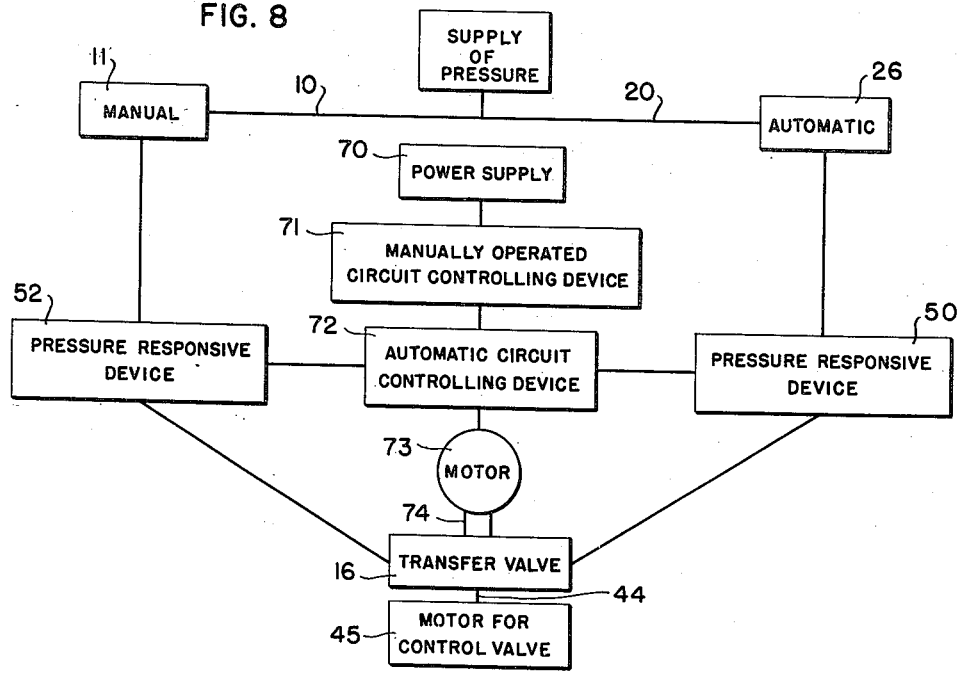
Fig. 8 is a diagrammatic or schematic view showing a modification in which the switch or transfer between automatic and manual control is effected automatically.

This automatic transfer of control is accomplished by having a motor, such as the differential pressure indicator 49 (Fig. 9), operate a valve or switch, which connects a motor (for operating the transfer valve 16) so as to connect the motor 45 (which operates a final control element, such as valve 46) either to the manually regulated fluid pressure or to the automatically regulated fluid pressure. The mechanism for performing this automatic shift over or transfer is illustrated by the block diagram of Fig. 8. Fig. 8 shows a supply of fluid pressure, such as air, communicating with a pipe 10, which furnishes a supply of fluid to a manually operated pressure regulator 11, and a pipe 20, which furnishes a supply of fluid to an automatically operated pressure regulator 26. A pressure responsive device 52 is responsive to the manually regulated fluid pressure and a pressure responsive device 50 is responsive to the automatically regulated fluid pressure. The manual regulator and the automatic regulator are also connected to a transfer valve 16 which communicates by means of a pipe 44 with a motor 45 which governs the final control element (valve 46 in Fig. 1). In order to operate the transfer valve 16 automatically, a power circuit is used. This power circuit is energized either by electricity or a source of fluid pressure, such as air. The power supply 70 is connected to a manually operable valve or switch 71 which is biased towards open circuit position. On its opposite side, the manually operable switch 71 is connected to an automatically operating pressure responsive valve or switch 72 which is moved between extreme open circuit positions so that when it is in intermediate position it connects or communicates with the power supply 70 through the switch or valve 71. Electricity or fluid pressure is connected through the automatic circuit controlling device 72 to the motor 73 which has a mechanical connection 74 for actuating the movable plug or member of the transfer valve 16. Manually operated circuit controlling device 71 is biased towards its normal open circuit position in order to prevent the automatic circuit controlling device 72 from shifting or hunting back and forth between the manual and automatic positions of transfer valve 16. If manual device 71 were not open, motor 73 would be energized from source 70 and hence operated as long as the pressure in the pressure responsive devices 50 and 52 were such as to close automatic circuit controlling device 72.

Operation of automatic transfer

In order to start a process under the control of a device such as that shown in Fig. 8, the manual control 11 is manipulated so that the motor 45 moves the final control element, such as valve 46 (Fig. 1), into a desired position. At the same time, the automatic control 26 is under the control of the pressure or other energy supply which actuates motor 45, so that, when the process has reached a steady state and is operating properly, the automatic control is in correct condition or position to take over control of the process. With the device in this condition, the device 71 is manually closed against its bias so that device 72 is connected to power supply 70. If the pressure in each of the devices 50 and 52 is at the selected value or ratio to one another, device 72 closes and motor 73 is energized from power supply 70. When motor 73 has shifted transfer valve 16 so motor 45 is under the control of the automatic control 26, device 71 can be opened or allowed to open by the operation of its bias. This opening prevents motor 73 from shifting transfer valve 16 back and forth between the manually and the automatically controlling positions. When it is desired to shift from automatic to manual control, device 71 is again closed and manual control 11 is operated to bring the pressure in device 52 to the proper value. Then device 72 automatically connects motor 73 to power supply 70 and motor 73 moves transfer valve 16 into the manual control position.

Electric relay circuit

Fig. 9 shows an automatic shift over or transfer for a control device by means of an electrically operated relay circuit. Fluid pressure in the pipe 20 communicates with the inlet to a relay valve 26 having a filter 27 and a restrictive orifice 28 in a conduit which communicates with a bleed pipe 29 terminating in a nozzle 30 controlled by a flapper (not shown) in response to the variations of the action or condition which is to control the process.

Inlet conduit 10 contains a pressure regulator 11 and communicates with a bellows 52 of a differential pressure operated indicator 49. Conduit 10 leads to one inlet port of a transfer valve 116A. From the outlet chamber of relay valve 26 leads a pipe 36 to a valve presently to be described. Also from the outlet chamber of relay 26 leads a pipe 38 communicating with a pipe 39 connected to one inlet conduit of the transfer valve 116A. From the outlet side of the transfer valve 116A a pipe 44 leads to the fluid pressure actuated motor 45 which controls the valve 46 in the process-controlling conduit 47. Pipe 51 communicates with the outlet pressure of relay valve 26 by means of a conduit 38 and leads to a second bellows 50 of the differential operated motor 49. Bellows 50 and 52 carry a strip 54A having a slot 75 in it.

Figure 10:
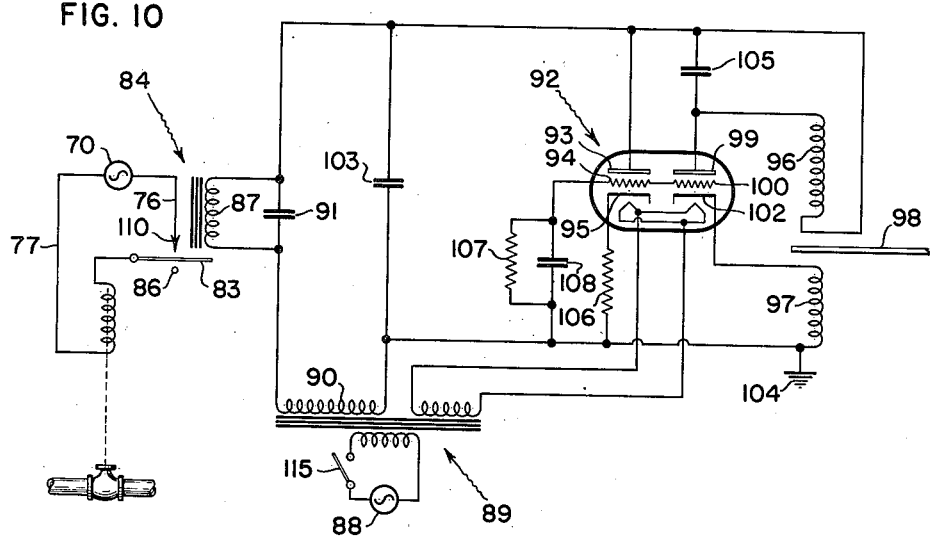
Fig. 10 is an electric circuit diagram of the electric relay-operating circuit of Fig. 9 controlling a single motor-operated valve.

A source of power 70, such as alternating current electricity, is connected to the power lines 76 and 77. Line 77 is connected to movable member 78 of a selector switch, generally indicated at 79, and having a stop 80 which limits its movement in one direction. Stationary contact 81 is connected by a power lead 82 to the movable member 83 of a relay, generally indicated at 84. Movable member 83 is biased by a spring 85 to open circuit position against stop 86. Coil 87, when energized, attracts movable member 83 against the bias of spring 85. Coil 87 is energized by an electronic circuit shown in detail in Fig. 10. This electronic circuit is part of apparatus disclosed in greater detail in the following copending applications: Serial No. 694,399, James C. Mouzon, Control Apparatus, filed August 31, 1946, now abandoned; Serial No. 694,401, W. H. Wannamaker, Control Apparatus, August 31, 1946, now patent 2,564,937, dated August 21, 1951. Fig. 10 shows that this electronic circuit is connected to a source of electric power 88, which energizes a transformer 89 having a secondary winding 90 connected, at one terminal, to one terminal of the relay-operating winding 87 and to one terminal of a by-pass condenser 91. The opposite ends of winding 87 and condenser 91 are connected to one plate 93 of a double triode electronic valve, generally indicated at 92. Valve 92 may conveniently be of the commercially available type 7N7. The valve (composed of plate 93, grid 94 and filament 95) does or does not operate as an oscillator depending upon the mutual inductance of suitably disposed inductance coils 96 and 97. The mutual inductance of coils 96 and 97 is varied according to the position of a pivotally mounted vane 94, which is a sector-shaped piece of stamped metal of good conductivity, such as copper or aluminum.

Vane 98 may be provided with suitable ribs to give greater strength and rigidity. Fig. 9 shows vane 98 and the coil 96. The coils 96 and 97 are spiral and are embedded in a casing of resinous plastic material. The coils and their surrounding casing are separated by a narrow notch or gap through which the vane 98 is freely movable. The valve comprising plate 99, grid 100 and filament 102 does not oscillate under any normal condition of operation. A by-pass condenser 103 is connected between the plates of the valve 92 and a second terminal of transformer winding 90. This transformer terminal is grounded at 104. A condenser 105 is connected in parallel with coil 96 to 99. Filament 95 is connected to ground 104 through a biasing resistor 106. The control grids 94 and 100 are connected to ground 104 through resistance 107 and by-pass condenser 108 parallel with it. Condenser 91 prevents the movable member 83 of the relay 84 from chattering as a result of a pulsating current flowing through it due to the A. C. energization of the oscillator. Suitable values of the circuit components are as follows: Power sources 70 and 88 may be branches of an ordinary electric light or power system supplying current at about 115 volts at a frequency of about 60 cycles per second. The resistance of resistor 106 is 500 ohms, the resistance of the resistor 107 is 0.5 megohm. The capacity of the condenser 103 is 0.005 microfarad, of condenser 108 is 0.015 microfarad of condenser 91 is 8 microfarads, of condenser 105 is 5 microfarads. The coil 96 comprises 9.5 and the coil 97 comprises 7.5 convolutions or turns of number 31, B & S gauge, copper wire. That wire is less than 0.009 inch in diameter. The inside diameter of the inner convolution of each coil is 3/8 of an inch. The greatest width of each casing for the coils is about 7/8 of an inch. The space through which the vane 98 travels is 1/8 inch thick.

The operation of this electronic circuit is explained in greater detail in the applications above referred to. In general, when the electronic circuit has been connected to its sources of power for a sufficient time for the 92 to be heated and to be in operating condition, if the vane 98 is moved between the coils 96 and 97 in such a direction as to decrease the mutual inductance of these coils the high frequency oscillation of the circuit is interrupted. When this high frequency oscillation is interrupted, the current flowing through the relay winding 87 increases, and the armature contact 83 is attracted by the relay winding 87 against the bias of its spring (not shown) and is brought into engagement with the cooperating stationary contact 110.

Referring now to Fig. 9, it will be seen that the stationary contact 110 is connected to a lead or wire 111 which connects to an electric motor 112, shown as the coil of a solenoid. Lead or wire 113 connects the opposite side of motor 112 to the line 76. Motor 112 is biased (by means not shown in the drawings) so that the movable member of the valve 116A is normally in the position in which it is shown in Fig. 9. In this position the movable valve plug or member 17A closes off conduit 10 and opens connection to conduits 39 and 44 so that the fluid pressure operated motor 45 is under the control of the automatically variable mechanism.

*Operation of electric automatic transfer*

If it is desired to shift the control of the device from the automatic position, in which it is shown in Fig. 9, to the manual position, in which the motor 45 is under the control of the manually operated pressure regulator 11, the switch 79 is manually operated by turning the movable switch arm 78 into contact with the stationary switch contact 81. This energizes the movable relay contact 83. If the automatically controlled fluid pressure in bellows 50 and the manually controlled fluid pressure in bellows 52 are equal or at some other ratio at which the differential pressure operated motor 49 is designed to operate, the motor 49 will rotate the vane 98 by engagement of the pin 114 in the slot 75 so that the vane 98 moves between the coils 96 and 97 (the latter is beneath coil 96 in Fig. 9 and therefore not shown). This varies the mutual inductance of coils 96 and 97, interrupts the oscillation of the electronic apparatus and causes relay winding 87 to be energized, which moves movable relay contact 83 into engagement with the stationary contact 110. This closes circuit across source 70 from line 77, switch blade 78, switch contact 81, wire 82, relay contact 83, stationary contact 110, line 111, motor 112, and line 113 to the lead wire 76. This energization of the motor 112 causes movable valve member 17A to open communication between pipes 10 and 44 and to close communication between pipes 39 and 44.

If it is desired to shift from the manual position to the automatic position shown in Fig. 9 the motor 112 is deenergized by turning selector switch 79 counterclockwise as seen in Fig. 9 out of engagement with stationary switch contact 81 into the position shown in Fig. 9.

The circuit shown in Fig. 9 is provided with a test position. In this position, the selector switch 79 is manually moved so that the movable switch blade 78 contacts the stationary switch contact 116. This energizes motor 117 and moves movable relay contact 118 out of contact with stationary relay contact 119. Contacts 118—119 control the connection of solenoid motor 120 across the terminal wires 76 and 77. Motor 120 has a slidable armature 121 which operates movable member 122 of a three-port valve 123. A pipe 124, controlled by a two-position valve 125, communicates with pipe 41 when the control system is under manual control. When the control system is in automatic position or in test position, pipe 41 communicates with pipe 36.

The control device is also provided with a service position. In service position, movable switch contact 78 engages stationary contact 126 and thus throws motor 127 of a two-position valve 128 across the terminal lines 76 and 77. Energization of motor 127 closes valve 123 and shuts off the supply of air through the inlet conduit 20 to the automatically actuated control apparatus. In parallel with motor 127 is motor 128 of the two-position valve 125 by means of wires 129 and 130. Energization of motor 128 closes valve 125 and shuts off the supply of manually controlled air from inlet conduit 10 to valve 123.

Figure 11:
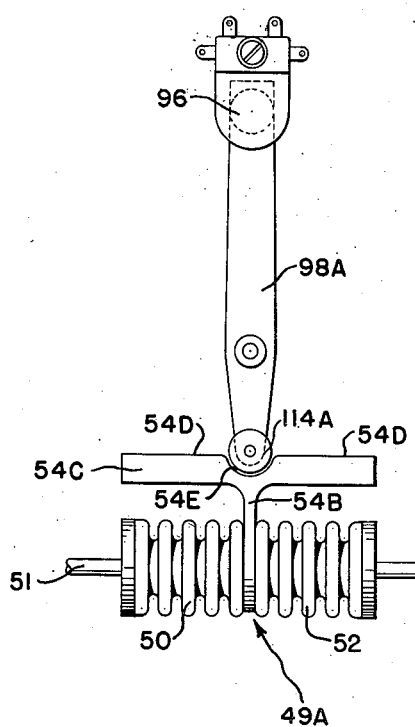
Fig. 11 is a view in detail of a modified form of relay operating device.
Figure 1A:
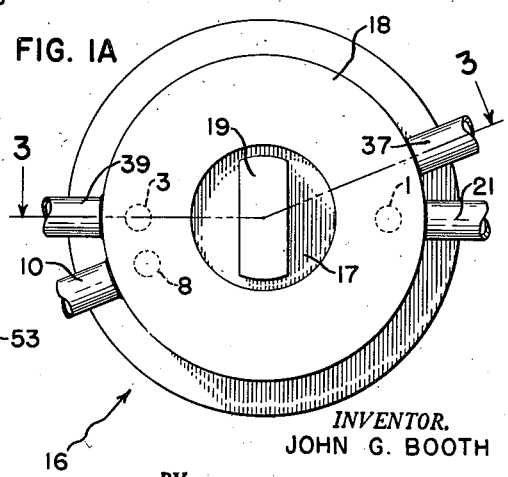
Fig. 1A is a front elevation of the transfer valve of Fig. 1.

Fig. 11 shows a modified form of a differential pressure operated motor. This modification 49A has pipe 51 communicating with bellows 50 and pipe 53 communicating with bellows 52. The bellows operated member 54B carries a cam 54C having two flat cam faces 54D and a notched cam face 54E. This notched cam face cooperates with a cam follower 114A pivotally mounted on the vane 98A whose opposite end moves between the coil 96 and the coil 97, which is mounted directly beneath coil 96 and which is not visible in Fig. 11. Vane 98A operates to vary the self induction of coils 96 and 97, which are connected in an electronic circuit, similar to that shown in Fig. 10, and containing a relay winding which is energized when the high frequency oscillation of the circuit is sufficiently reduced.

Figure 12:
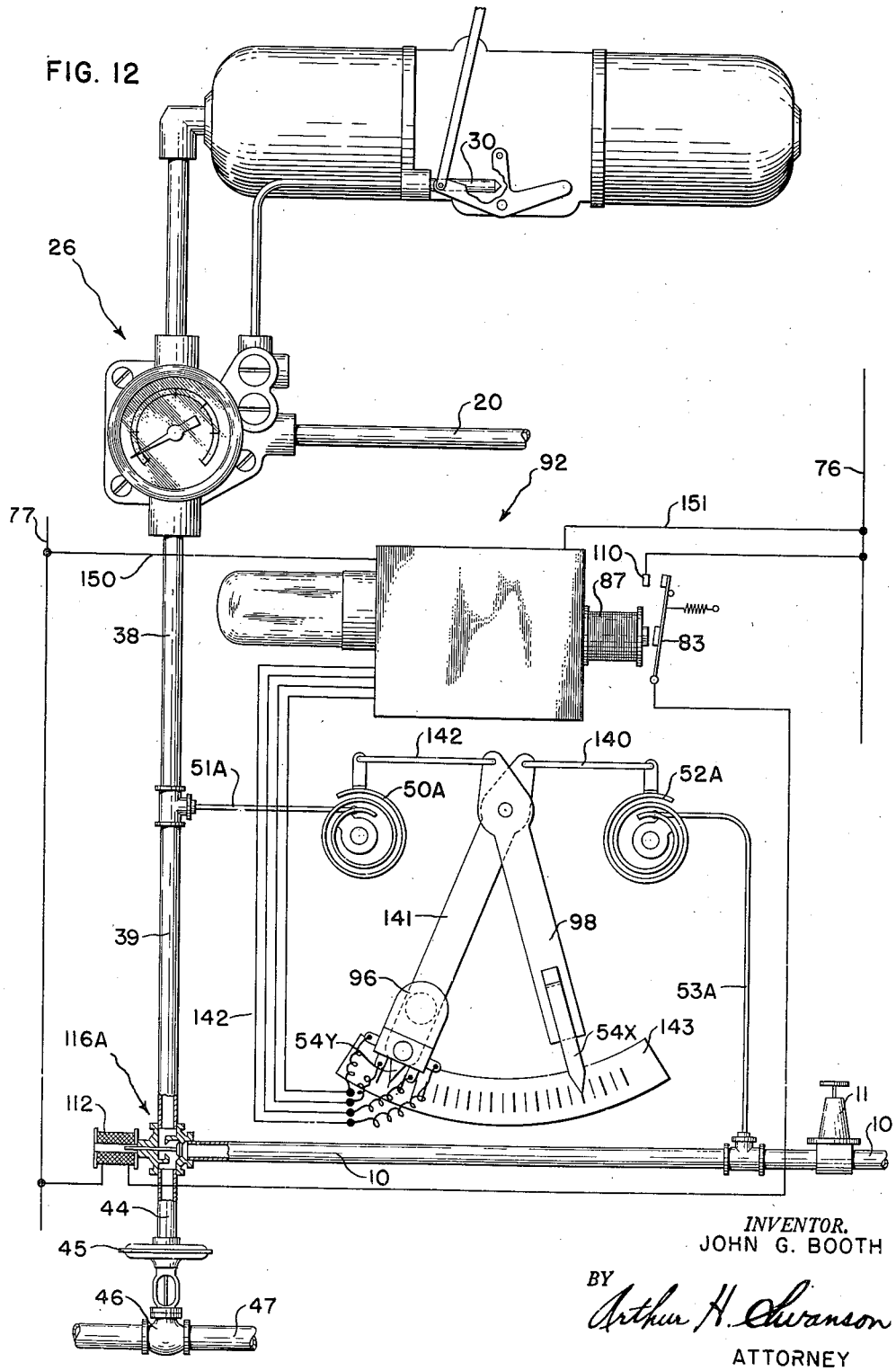
Fig. 12 is a diagrammatic or schematic view with parts shown in front elevation or in cross section of another modification.

Fig. 12 shows a modification of the control apparatus in which the vane 98 and the coils 96 and 97 are both mounted for movement, each in response to one of the control fluid pressure. Coil 97 is beneath coil 96 and is therefore invisible in Fig. 12. Air enters through the inlet conduit 10 and the manually controlled pressure regulator 11 and passes through the pipe 53A to the Bourdon or spiral tube 52A whose movable end is pivotally connected by means of a link 140 to the pivotally mounted lever or arm 141 on which the coils 97 and 96 are mounted.

Air for the automatically variable device is supplied through inlet conduit 20 to the relay valve 26 connected to the nozzle 30 which is automatically controlled by means of a flapper (not shown) in response to that action or condition to which it is desired to have the process respond. The air outlet chamber of the relay valve 26 is connected to the pipe 38 and pipe 39. This pressure is applied through pipe 51A to a second spiral or Bourdon tube 50A. The free or movable end of tube 50A is pivotally linked by a connection 142 with the end of the vane 98. Vane 98 and the support 141 for the coils 96 and 97 are both movable over and past a scale 143 so that vane 98 and support 141 serve to indicate the automatically and the manually regulated air pressure, respectively. Moreover vane 98 and support 141 may be adjusted so that the vane 98 interrupts the mutual inductance of the coils 96 and 97 at a desired value of the manual fluid pressure and of the automatic fluid pressure. The end of the longer arm of vane 98 is in a proper plane to pass between the coils 96 and 97. This end of vane 98 carries a pointer 54X which is bent out of the plane of coils 96 and 97 and thus passes these coils while pointer 54X nevertheless cooperates with the markings on scale 143. Support 141 also carries a pointer 54Y which is readable against 143. The coils 96 and 97 are connected into a circuit as shown in Fig. 10 by means of a plurality of flexible lead wires 142. This circuit includes electronic valve 92 and the relay winding 87. The movable relay contact 83 cooperates with the stationary contact 110 to connect the electric motor 112 of the transfer valve 116A across the power circuit consisting of the lines 76 and 77. Fig. 12 shows the wiring as being connected across the power supply lines 76 and 77 which are located at opposite sides of the figure. Power supply for the electronic relay operating circuit is connected across these leads 76 and 77 by means of wires 150 and 151. Depending upon the position of the transfer valve 116A, manually controlled air (from the supply pipe 10) or automatically controlled air (from the supply pipe 20, the relay valve 26, and the pipes 38 and 39), is conducted through the pipe 44 to the fluid pressure operated motor 45 which controls the valve 46 governing the flow through the conduit 47.

*Summary*

From the foregoing it will be seen that this invention provides means for operating a transfer valve which shifts the control of a final process-controlling element between a manually controlled and an automatically controlled fluid pressure. The operation of this transfer valve may be either manual or automatic. The power for operating the transfer valve automatically may be either electricity or a fluid, such as air. By means of a relay controlling the motor which operates the transfer valve, the switch over or transfer of control can take place with a snap or substantially instantaneous movement. The values of the manual and the automatic variable pressures at which this transfer take place can be adjusted very precisely to any point in a selected range of values.

Subject matter disclosed in this application but not claimed herein and concerned with the automatic transfer between automatic and manual regulating controllers is disclosed and is being claimed in my divisional application filed on March 19, 1951 and bearing Serial No. 216,300.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. A pneumatically-operated control for automatically or manually regulating an action or condition, said control including, piping connections adapted for communication with a supply of compressed air, a manually operable pressure regulator having an inlet connected to said supply and having an outlet, a gauge connected to said outlet for indicating the pressure output from said regulator, a pneumatically operated relay valve having an inlet connected to said supply and having an outlet through which there is an output of air variable under the regulation of a selected control condition, a follow-up unit connected to the outlet of said relay valve and operating to oppose the regulation imposed on said relay valve by said selected control condition, a second gauge connected to the outlet from said relay valve for indicating the output from said relay valve, a control element for regulating an action or condition either manually under the control of said regulator or automatically under the control of said relay valve, and a plug valve comprising a valve body having ports therethrough, each port forming one end of a conduit, port 1 being connected to said supply, port 2 being connected to the inlet of said relay valve, port 3 being connected to said control element, ports 4 and 5 being connected to the outlet from said relay valve and to said second gauge, port 6 being connected to the follow-up unit of said relay valve, port 7 being connected with the outlet from said pressure regulator, port 8 being connected with said control element, and a plug movably mounted in said valve body and selectively manually adjustable to one of the following four positions, "automatic" position in which ports 1 and 2 communicate, ports 3 and 4 communicate, ports 5 and 6 communicate, and ports 7 and 8 are closed, "manual" position in which ports 1 and 2 communicate, ports 3, 4 and 5 are closed, and ports 6, 7 and 8 communicate, "test" or "check" position in which ports 1 and 2 communicate, ports 3 and 4 are closed, ports 5 and 6 communicate and ports 7 and 8 communicate, and "service" position in which ports 1, 3, 2 and 4 are closed, ports 5 and 6 may be optionally open or closed, and ports 7 and 8 communicate, whereby in "service" position said relay valve can be removed from the remaining parts of the control for repair or replacement.

2. A pneumatically operated control for automatically or manually regulating an action or condition, said control including, piping connections adapted for communication with a supply of compressed air, a manually operable pressure regulator having an inlet connected to said supply and having an outlet, a pneumatically operated relay valve having an inlet connected to said supply and having an outlet through which there is an output of air variable under the regulation of a selected control condition, a follow-up unit connected to the outlet of said relay valve and operating to oppose the regulation imposed on said relay valve by said selected control condition, a gauge connected to the outlet from said relay valve for indicating the output from said instrument, a control element for regulating an action or condition either manually under the control of said regulator or automatically under the control of said relay valve, and a plug valve comprising a valve body having ports therethrough, each port forming one end of a conduit, port 1 being connected to said supply, port 2 being connected to the inlet of said relay valve, port 3 being connected to said control element, ports 4 and 5 being connected to the outlet from said relay valve and to said gauge, port 6 being connected to the follow-up unit of said relay valve, port 7 being connected with the outlet from said pressure regulator, port 8 being connected with said control element, and a plug movably mounted in said valve body and selectively manually adjustable to one of the following four positions, "automatic" position in which ports 1 and 2 communicate, ports 3 and 4 communicate, ports 5 and 6 communicate, and ports 7 and 8 are closed, "manual" position in which ports 1 and 2 communicate, ports 3, 4 and 5 are closed, and ports 6, 7 and 8 communicate, "test" or "check" position in which ports 1 and 2 communicate, ports 3 and 4 are closed, ports 5 and 6 communicate, and ports 7 and 8 communicate, and "service" position in which ports 1, 2, 3 and 4 are closed, ports 5 and 6 may be optionally open or closed, and ports 7 and 8 communicate, whereby in "service" position said relay valve can be removed from the remaining parts of the control for repair or replacement.

3. A pneumatically operated control for automatically or manually regulating an action or condition, said control including, piping connections adapted for communication with a supply of compressed air, a manually operable pressure regulator having an inlet connected to said supply and having an outlet, a gauge connected to said outlet for indicating the pressure output from said regulator, a pneumatically operated relay valve having an inlet connected to said supply and having an outlet through which there is an output of air variable under the regulation of a selected control condition, a follow-up unit connected to the outlet of said relay valve and operating to oppose the regulation imposed on said relay valve by said selected control condition, a control element for regulating an action or condition either manually under the control of said regulator or automatically under the control of said relay valve, and a plug valve comprising a valve body having ports therethrough, each port forming one end of a conduit, port 1 being connected to said supply, port 2 being connected to the inlet of said instrument, port 3 being connected to said controlled element, ports 4 and 5 being connected to the outlet from said instrument, port 6 being connected to the follow-up unit of said relay valve, port 7 being connected with the outlet from said pressure regulator, port 8 being connected with said control element, and a plug movably mounted in said valve body and selectively manually adjustable to one of the following four positions, "automatic" position in which ports 1 and 2 communicate, ports 3 and 4 communicate, ports 5 and 6 communicate, and ports 7 and 8 are closed, "manual" position in which ports 1 and 2 communicate, ports 3, 4 and 5 are closed, and ports 6, 7 and 8 communicate, "test" or "check" position in which ports 1 and 2 communicate, ports 3 and 4 are closed, ports 5 and 6 communicate, and ports 7 and 8 communicate, and "service" position in which ports 1, 2, 3 and 4 are closed, ports 5 and 6 may be optionally open or closed, and ports 7 and 8 communicate, whereby in "service" position said relay valve can be removed from the remaining parts of the control for repair or replacement.

4. A pneumatically operated control for automatically or manually regulating an action or condition, said control including, a supply of compressed air, a manually operable pressure regulator having an inlet connected to said supply and having an outlet, a pneumatically operated relay valve having an inlet connected to said supply and having an outlet through which there is an output of air variable under the regulation of a selected control condition, a follow-up unit connected to the outlet of said relay valve and operating to oppose the regulation imposed on said relay valve by said selected control condition, a control element for regulating an action or condition either manually under the control of said regulator or automatically under the control of said relay valve, and a plug valve comprising a valve body having ports therethrough, each port forming one end of a conduit, port 1 being connected to said supply, port 2 being connected to the inlet of said instrument, port 3 being connected to said controlled element, ports 4 and 5 being connected to the outlet from said instrument, port 6 being connected to the follow-up unit of said relay valve, port 7 being connected with the outlet from said pressure regulator, port 8 being connected with said control element, and a plug movably mounted in said valve body and selectively manually adjustable to one of the following four positions, "automatic" position in which ports 1 and 2 communicate, ports 3 and 4 communicate, ports 5 and 6 communicate, and ports 7 and 8 are closed, "manual" position in which ports 1 and 2 communicate, ports 3, 4 and 5 are closed, and ports 6, 7 and 8 communicate, "test" or "check" position in which ports 1 and 2 communicate, ports 3 and 4 are closed, ports 5 and 6 communicate, and ports 7 and 8 communicate, and "service" position in which ports 1, 2, 3 and 4 are closed, ports 5 and 6 may be optionally open or closed, and ports 7 and 8 communicate, whereby in "service" position said relay valve can be removed from the remaining parts of the control for repair or replacement.

JOHN G. BOOTH.

REFERENCES CITED

The following references are of record in the file of this patent:

UNITED STATES PATENTS

| Number | Name | Date |
|---|---|---|
| 2,369,887 | Eckman | Feb. 20, 1945 |